US010946927B2

(12) United States Patent
Noguchi

(10) Patent No.: US 10,946,927 B2
(45) Date of Patent: Mar. 16, 2021

(54) SHOCK ABSORBER

(71) Applicant: KYB MOTORCYCLE SUSPENSION CO., LTD., Gifu (JP)

(72) Inventor: Nobuhiro Noguchi, Gifu (JP)

(73) Assignee: KYB MOTORCYCLE SUSPENSION CO., LTD., Gifu (JP)

( * ) Notice: Subject to any disclaimer, the term of this patent is extended or adjusted under 35 U.S.C. 154(b) by 314 days.

(21) Appl. No.: 16/203,852

(22) Filed: Nov. 29, 2018

(65) Prior Publication Data

US 2019/0168839 A1 Jun. 6, 2019

(30) Foreign Application Priority Data

Dec. 6, 2017 (JP) .............................. JP2017-234496

(51) Int. Cl.
| | |
|---|---|
| B62K 25/08 | (2006.01) |
| B62K 25/10 | (2006.01) |
| F16F 9/04 | (2006.01) |
| B62K 25/28 | (2006.01) |
| F16F 9/084 | (2006.01) |
| F16F 9/096 | (2006.01) |
| F16F 9/088 | (2006.01) |

(52) U.S. Cl.
CPC ............ B62K 25/10 (2013.01); B62K 25/283 (2013.01); F16F 9/0436 (2013.01); F16F 9/084 (2013.01); F16F 9/096 (2013.01); *B60G 2202/00* (2013.01); *B60G 2202/15* (2013.01); *B60G 2202/24* (2013.01); *B60G 2300/12* (2013.01); *B62K 2201/08* (2013.01); *F16F 9/088* (2013.01)

(58) Field of Classification Search
CPC .. B62K 25/10; B62K 25/283; B62K 2201/08; F16F 9/0436; F16F 9/088; F16F 9/064; F16F 9/096; F16F 9/084; B60G 2202/00; B60G 2202/15; B60G 2202/24; B60G 2300/12

See application file for complete search history.

(56) References Cited

U.S. PATENT DOCUMENTS

| | | | | |
|---|---|---|---|---|
| D661,626 | S * | 6/2012 | Aymar | .......................... D12/159 |
| 10,145,438 | B2 * | 12/2018 | Uotani | ................... B62K 25/283 |
| 2010/0116608 | A1 * | 5/2010 | Runkel | ..................... F16F 9/096 |
| | | | | 188/314 |
| 2010/0163357 | A1 * | 7/2010 | Hunter | .................... B60G 11/30 |
| | | | | 188/319.2 |
| 2011/0017559 | A1 * | 1/2011 | Sintorn | ................ B60G 15/062 |
| | | | | 188/314 |

(Continued)

FOREIGN PATENT DOCUMENTS

JP 2010-121687 A 6/2010

*Primary Examiner* — Ruth Ilan
*Assistant Examiner* — Marlon A Arce
(74) *Attorney, Agent, or Firm* — Paratus Law Group, PLLC

(57) ABSTRACT

A shock absorber includes a cylinder including a working chamber therein; a rod configured to be axially movably inserted into the cylinder; and a plurality of tanks configured to be integrally attached to the cylinder, wherein an interior of one of the tanks is comparted into a liquid chamber configured to be communicated with the working chamber and filled with liquid and an air chamber filled with gas, and a sub-air chamber configured to be communicated with the air chamber is formed in the other tank.

5 Claims, 6 Drawing Sheets

(56) References Cited

U.S. PATENT DOCUMENTS

2014/0091552 A1* 4/2014 Tominaga ............... B62K 11/00
   280/284
2016/0363184 A1* 12/2016 Noguchi ................. F16F 9/585
2017/0282996 A1* 10/2017 Murakami ......... B60G 17/0272
2019/0346005 A1* 11/2019 Tanaka .................... F16F 9/084

* cited by examiner

SHOCK ABSORBER

CROSS-REFERENCE TO RELATED APPLICATIONS

This application is based on and claims the benefit of priority from Japanese Patent Application No. 2017-234496, filed on Dec. 6, 2017, the entire contents of which are incorporated herein by reference.

BACKGROUND OF THE INVENTION

Technical Field

The present invention relates to improvement of a shock absorber.

Related Art

Conventional shock absorbers include those including a shock absorber body including a cylinder and a rod axially movably inserted into the cylinder, the shock absorber body being expandable and contractible, and a tank provided outside the cylinder, the tank delivering and receiving a liquid with respect to a working chamber in the cylinder when the shock absorber body is expanded and contracted.

The aforementioned shock absorbers with a tank include those in which a tank having a roughly cylindrical shape is integrally attached to an end of the cylinder perpendicularly to the cylinder for sufficient volume of the tank and favorable mountability on a vehicle as disclosed, for example, in JP 2010-121687 A.

SUMMARY OF THE INVENTION

When a single tank is integrally attached to a cylinder as in the case of the conventional shock absorbers, a large lump including a tank is present in the position of the cylinder for the sake of sufficient volume of the tank. Thus, the projection amount of the tank projecting from the cylinder radially outward in one direction (hereinafter, simply the projection amount) increases, resulting in that it can be difficult to accommodate the shock absorber in a predetermined attachment space.

Specifically, for example, when the aforementioned conventional shock absorber is used for a rear cushion apparatus for suspending a rear wheel of a saddle-type vehicle, the shock absorber is sometimes mounted such that the tank and the cylinder are arranged on front and rear sides on the vehicle body. However, some vehicles have small spaces on the front and rear sides of the cylinder. The conventional shock absorber has a limitation in having sufficient tank volume and having a small diameter of the tank to suppress the projection amount of the tank projecting forward or rearward from the cylinder.

Therefore, the conventional shock absorber cannot be applied due to excessive projection amount of the tank from the cylinder depending on a target to which the shock absorber is attached, e.g., the type of vehicle on which the shock absorber is mounted. Such a problem can occur regardless of the projection direction of the tank with respect to the cylinder.

It is an object of the present invention to provide a shock absorber that can solve the problem such that the projection amount of the tank from the cylinder is reduced to increase the mountability.

For this purpose, the shock absorber includes a plurality of tanks integrally attached to a cylinder including a working chamber therein, compacts the interior of one of the tanks into a liquid chamber communicated with the working chamber and filled with a liquid and an air chamber filled with gas, and forms sub-air chambers communicated with the air chamber in the interiors of the other tanks.

DESCRIPTION OF THE EMBODIMENTS

Figure 1:
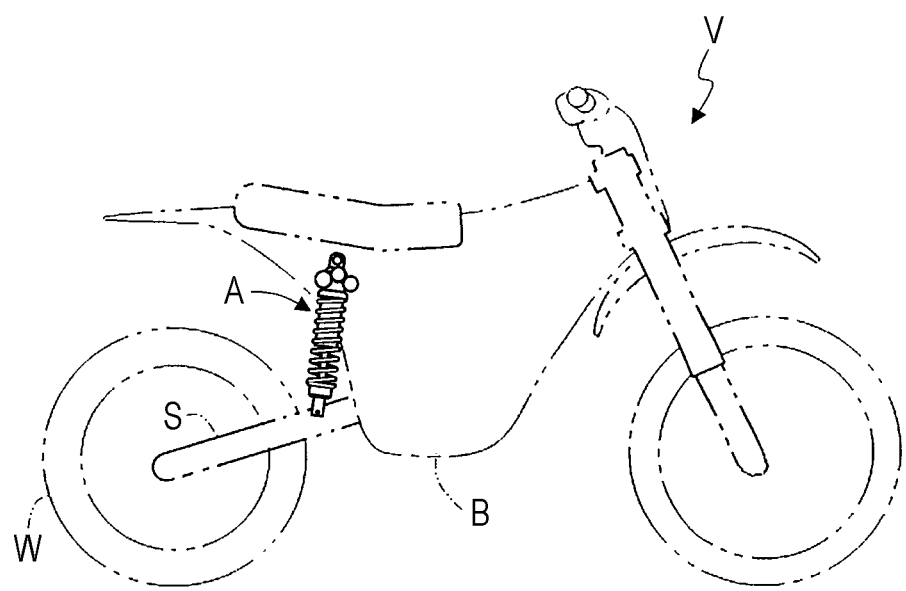
FIG. 1 is a side view of a saddle-type vehicle with a shock absorber according to an embodiment of the present invention.

A shock absorber according to an embodiment of the present invention is described below with reference to the drawings. Reference numerals designated in some of the drawings indicate the same components.

As illustrated in FIG. 1, a shock absorber A according to an embodiment of the present invention is used for a rear cushion apparatus for suspending a rear wheel W of a saddle-type vehicle V. In the description below, the upper side and the lower side in a state where the shock absorber A is attached to a vehicle respectively indicate the "upper side" and the "lower side" of the shock absorber A unless otherwise specified.

Figure 2:
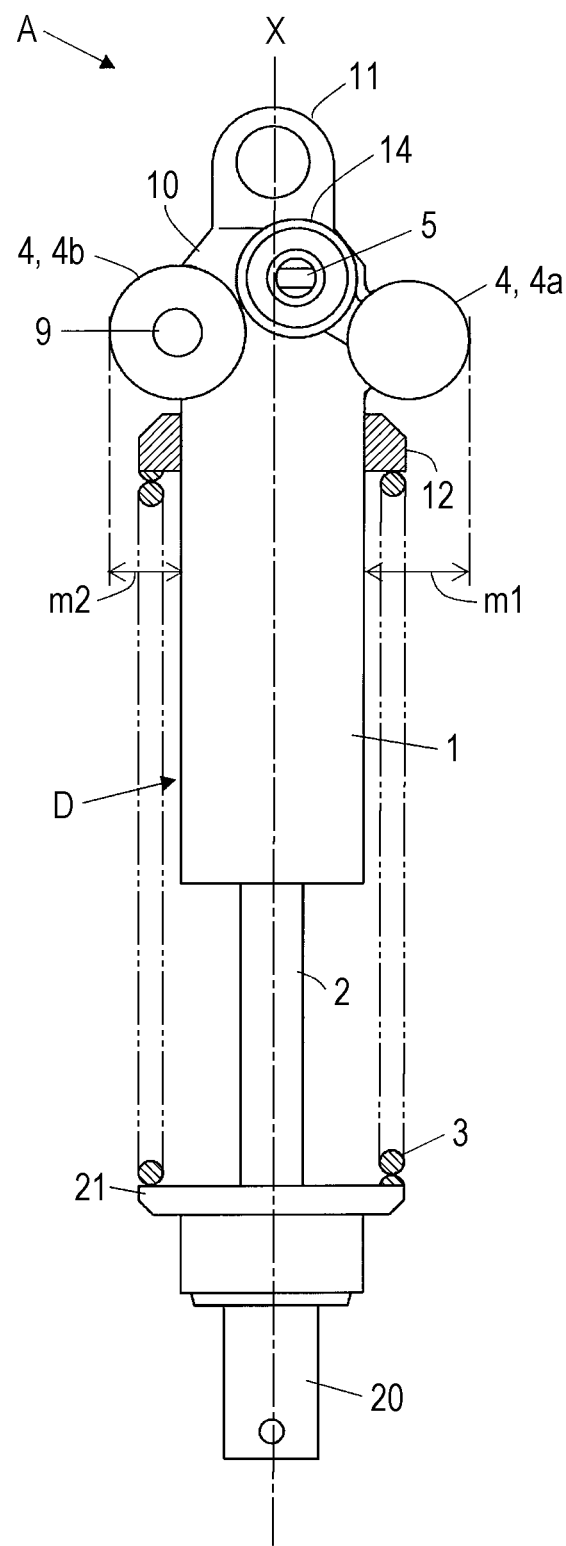
FIG. 2 is a front view of a shock absorber according to an embodiment of the present invention.

As illustrated in FIG. 2, the shock absorber A includes a shock absorber body D including a cylinder 1 and a rod 2 that enters or leaves the cylinder 1, the shock absorber body D being expandable and contractible, a suspension spring provided on an outer circumference of the shock absorber body D, two tanks 4 and 4 integrally attached to the cylinder 1 above the suspension spring 3, and an adjuster 5 for adjusting a damping force generated when the shock absorber body D is expanded and contracted.

The shock absorber A is an inverted type and is attached to the saddle-type vehicle V with the rod 2 protruding out of the cylinder 1 facing downward from the cylinder 1. Specifically, a lid 10 closing an upper end of the cylinder 1 includes a vehicle body-side attachment portion 11, and the cylinder 1 is coupled to a vehicle body (FIG. 1) via the vehicle body-side attachment portion 11. A wheel-side attachment portion 20 is attached to a lower end of the rod 2 protruding downward from the cylinder 1, and the rod 2 is coupled to a swing arm S (FIG. 1) via the wheel-side attachment portion 20.

The swing arm S is swingably attached to a vehicle body B and supports the axle of the rear wheel W such that the axle can be moved up and down. That is, the rod 2 is coupled to the axle via the swing arm S. Thus, the shock absorber A is interposed between the vehicle body B and the axle. When, for example, the saddle-type vehicle V runs on a bumpy road surface and the rear wheel W oscillates up and down relative to the vehicle body B, the rod 2 enters or leaves the cylinder 1 and the shock absorber body D is expanded and contracted.

The suspension spring 3 is a coil spring, and an upper end of the suspension spring 3 is supported by an upper spring receiver 12 placed on an outer circumference of the cylinder 1. A lower end of the suspension spring 3 is supported by a lower spring receiver 21 provided on the wheel-side attachment portion 20. As described above, the wheel-side attachment portion 20 is attached to the rod 2. Therefore, when the rod 2 enters the cylinder 1 and the shock absorber body D is contracted, the suspension spring 3 is compressed and elastically deformed. In contrast, when the rod 2 leaves the cylinder 1 and the shock absorber body D is expanded, the suspension spring 3 expands by its own elasticity.

Thus, the suspension spring 3 is also expanded and contracted following the expansion and contraction of the shock absorber body D such that the shock absorber A is generally expanded and contracted. Furthermore, the suspension spring 3 exhibits an elastic force corresponding to its deformation amount and biases the shock absorber body D in the expansion direction. In the shock absorber A, the suspension spring 3 elastically supports the vehicle body.

The upper spring receiver 12 is screwed to an outer circumference of the cylinder 1 and is movable in the axial direction of the cylinder 1. Therefore, the initial load of the suspension spring 3 can be adjusted when the position (height) of the upper spring receiver 12 is changed with respect to the cylinder 1.

The method of adjusting the initial load of the suspension spring 3 is not limited to the above. For example, a cam mechanism, a jack mechanism or the like may be used to drive the upper spring receiver 12 or the lower spring receiver 21. An initial load adjustment mechanism is, of course, not necessarily provided in the shock absorber A, and the suspension spring 3 may be a spring, e.g., an air spring, other than a coil spring. In addition, the suspension spring 3 may be provided separately from the shock absorber A.

The direction of attaching the shock absorber A can be changed. For example, the shock absorber A may be an upright type such that an upper end of the rod 2 protruding upward from the cylinder 1 is coupled to the vehicle body B and the cylinder 1 is coupled to the axle. A target to which the shock absorber A is attached may be changed properly. For example, a saddle-type vehicle indicates an overall vehicle type in which a driver straddles the vehicle. The shock absorber A may, of course, be used to any saddle-type vehicles and may be used to a vehicle other than the saddle-type vehicle and may be used to those other than vehicles.

Figure 3:
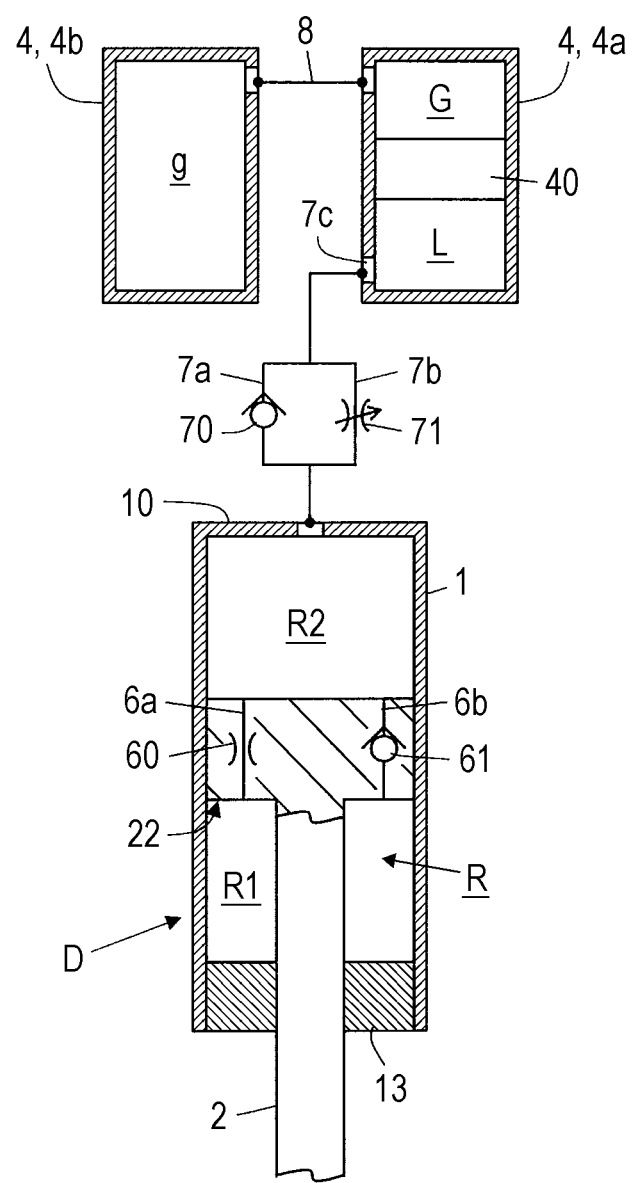
FIG. 3 is a principle view of a shock absorber according to an embodiment of the present invention.

Next, as illustrated in FIG. 3, an upper end of the cylinder 1 is closed by the lid 10. At a lower end of the cylinder 1, a rod guide 13 having an annular shape is placed through which the rod 2 is slidably supported. A seal (not illustrated) is stacked in the rod guide 13. The seal seals an outer circumference of the rod 2. Thus, the cylinder 1 is closed at both ends.

Inside the cylinder 1 and between the lid 10 and the rod guide 13, a working chamber R filled with a liquid, e.g., a hydraulic oil, is formed, and a piston 22 that comparts the working chamber R into an expansion-side chamber R1 and a pressure-side chamber R2 is slidably inserted. The piston 22 is coupled to an upper end of the rod 2. In the working chamber R, the expansion-side chamber R1 present on the side of the rod 2 of the piston 22 and the pressure-side chamber R2 is present on the opposite side (anti-rod side).

The piston 22 includes an expansion-side passage 6a and a pressure-side passage 6b through which the expansion-side chamber R1 communicates with the pressure-side chamber R2. The expansion-side passage 6a includes a damping element 60 that exerts resistance to the flow of liquid flowing from the expansion-side chamber R1 to the pressure-side chamber R2 through the expansion-side passage 6a. The pressure-side passage 6b includes a check valve 61. The check valve 61 permits the flow of liquid flowing from the pressure-side chamber R2 to the expansion-side chamber R1 through the pressure-side passage 6b, but prevents the opposite direction flow.

Each of the two tanks 4 and 4 has a cylindrical shape, and each tank 4 is closed by a lid (not designated by reference numeral) at both ends. In the tank 4, which is one of the two tanks 4 and 4, a liquid chamber L filled with the same liquid as the liquid in the cylinder 1 and an air chamber G filled with gas, e.g., air, are formed, and a free piston 40 that separates the liquid chamber L from the air chamber G is slidably inserted.

The tank 4 containing liquid and gas is hereinafter referred to as a main tank 4a. A connection connecting the main tank 4a and the cylinder 1 includes a suction passage 7a and a discharge passage 7b through which the pressure-side chamber R2 communicates with the liquid chamber L. The suction passage 7a includes a check valve 70. The check valve 70 permits the flow of liquid flowing from the liquid chamber L to the pressure-side chamber R2 through the suction passage 7a, but prevents the opposite direction flow. The discharge passage 7b includes a damping element 71 that exerts resistance to the flow of liquid flowing from the pressure-side chamber R2 to the liquid chamber L through the discharge passage 7b.

In the other tank 4, a sub-air chamber g filled with the same gas as the gas in the main tank 4a is formed. Such a tank 4 is hereinafter referred to as a gas tank 4b. A connection connecting the gas tank 4b and the main tank 4a includes a gas passage 8 through which the air chamber G communicates with the sub-air chamber g. The gas passage 8 does not prevent the gas from moving back and forth between the air chamber G and the sub-air chamber g. Therefore, the air chamber G and the sub-air chamber g have an equal pressure.

With the aforementioned configuration, when the shock absorber body D is expanded and the rod 2 leaves the cylinder 1, the piston 22 moves downward in the cylinder 1 and the expansion-side chamber R1 is reduced such that the liquid in the expansion-side chamber R1 moves to the pressure-side chamber R2 through the expansion-side passage 6a. The damping element 60 exerts resistance to the flow of the liquid. Therefore, when the shock absorber body D is expanded, the pressure of the expansion-side chamber R1 rises, and the damping force on the expansion side that prevents expansion operation of the shock absorber body D occurs. Furthermore, when the shock absorber body D is expanded, the check valve 70 is opened. The liquid corresponding to the volume of the rod leaving the cylinder 1 is fed from the liquid chamber L to the pressure-side chamber R2 through the suction passage 7a.

In cases where the shock absorber body D is expanded, when the liquid in the main tank 4a is reduced as a result of outflow of the liquid from the liquid chamber L, the free piston 40 moves toward the liquid chamber L, the volume of the liquid chamber L is reduced, and the volume of the air chamber G is increased. The air chamber G communicates with the sub-air chamber g through the gas passage 8. Therefore, when the volume of the air chamber G is increased, the gas moves from the sub-air chamber g to the air chamber G, and the pressures of the air chamber G and the sub-air chamber g are reduced.

In contrast, when the shock absorber body D is contracted and the rod 2 enters the cylinder 1, the piston 22 moves upward in the cylinder 1 and the pressure-side chamber R2 is reduced such that the liquid in the pressure-side chamber R2 opens the check valve 61 and moves to the expansion-side chamber R1 through the pressure-side passage 6*b*. When the shock absorber body D is contracted, the liquid corresponding to the volume of the rod entering the cylinder 1 discharged from the pressure-side chamber R2 to the liquid chamber L through the discharge passage 7*b*. The damping element 71 exerts resistance to the flow of the liquid. Therefore, when the shock absorber body D is contracted, the pressure in the cylinder 1 rises, and the damping force on the pressure side that prevents contraction operation of the shock absorber body D occurs.

In cases where the shock absorber body D is contracted, when the liquid in the main tank 4*a* is increased as a result of inflow of the liquid to the liquid chamber L, the free piston 40 moves toward the air chamber G, the volume of the liquid chamber L is increased, and the volume of the air chamber G is reduced. The air chamber G communicates with the sub-air chamber g through the gas passage 8. Therefore, when the volume of the air chamber G is reduced, the gas moves from the air chamber G to the sub-air chamber g, and the pressures of the air chamber G and the sub-air chamber g rise.

Thus, in the shock absorber A of the present embodiment, the air chamber G and the sub-air chamber g act as a continuous air chamber, and the main tank 4*a* and the gas tank 4*b* function as a single tank that accommodates gas and liquid. Thus, even when an overall tank volume is ensured, the main tank 4*a* and the gas tank 4*b* have a small size and a small projection amount with respect to the cylinder 1.

Note that insofar as the volume ratio of the liquid chamber L to the air chamber G can be changed when the liquid moves between the cylinder 1 and the main tank 4*a* following expansion and contraction of the shock absorber A, those other than the free piston 40 may be used as the separation member that separates the liquid chamber L from the air chamber G. For example, as the separation member, a bladder, a bellows or the like may be used.

As the damping elements 60 and 71 that exert resistance to the flow of liquid, a valve, e.g., a leaf valve or a poppet valve, an orifice, a choke, or the like may be used. In the present embodiment, the adjuster 5 (FIG. 2) can operate the damping element 71 to adjust the damping force on the pressure side. However, the damping element 71 may be operated in any way.

When a leaf valve and a biasing spring that biases the leaf valve in the closing direction are used as the damping element 71, there is, for example, a method of changing the initial load of the biasing spring with the adjuster 5. When an orifice is used as the damping element 71, there is a method of changing the opening amount of orifice with the adjuster 5. The adjuster 5 may be used for adjusting the expansion-side damping force.

When the liquid moves between the cylinder 1 and the main tank 4*a* following expansion and contraction of the shock absorber body D, the configurations of the passages connecting the expansion-side chamber R1, the pressure-side chamber R2, and the liquid chamber L, and the configurations of the damping elements and the check valves provided in the passages can be changed properly.

A gas valve 9 (FIG. 2) is attached to the gas tank 4*b*. The gas can be fed to and discharged from the sub-air chamber g through the gas valve 9. As described above, the sub-air chamber g communicates with the air chamber G through the gas passage 8. Therefore, it can also be said that the gas can be fed to or discharged from the air chamber G through the gas valve 9. When the gas is fed to and discharged from the air chamber G and the sub-air chamber g, the pressures of the air chamber G and the sub-air chamber g can be adjusted.

Next, as illustrated in FIGS. 4 to 7, the main tank 4*a* and the gas tank 4*b* are integrally attached to the cylinder 1 together with the lid 10 and the vehicle body-side attachment portion 11. In the present embodiment, the cylinder 1, the lid 10, the vehicle body-side attachment portion 11, the main tank 4*a*, and the gas tank 4*b* are integrally formed by casting, cutting, or the like, and form a cylinder-tank combined member C, which is a single component.

Figure 7:
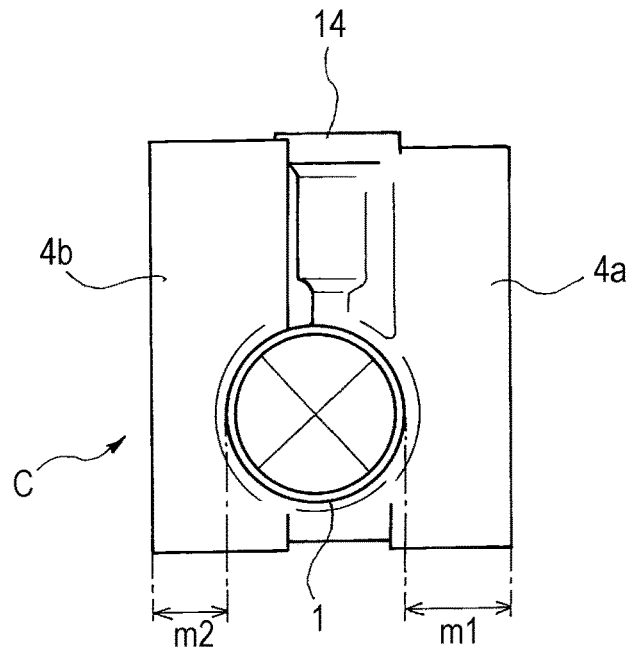
FIG. 7 is a bottom view illustrating a cylinder-tank combined member of a shock absorber according to an embodiment of the present invention.

Thus, since the cylinder 1, the main tank 4*a*, and the gas tank 4*b* are integrally formed, the cylinder 1, the main tank 4*a*, and the gas tank 4*b* can share partition walls that separate the inside and the outside thereof. Specifically, in the present embodiment, the main tank 4*a* and the gas tank 4*b* are arranged to sandwich the cylinder 1 on both sides when the shock absorber A is viewed in the axial direction (one axial end side of the cylinder 1) (FIG. 7). The cylinder 1 and the main tank 4*a*, and the cylinder 1 and the gas tank 4*b* partially share the partition walls.

Figure 4:
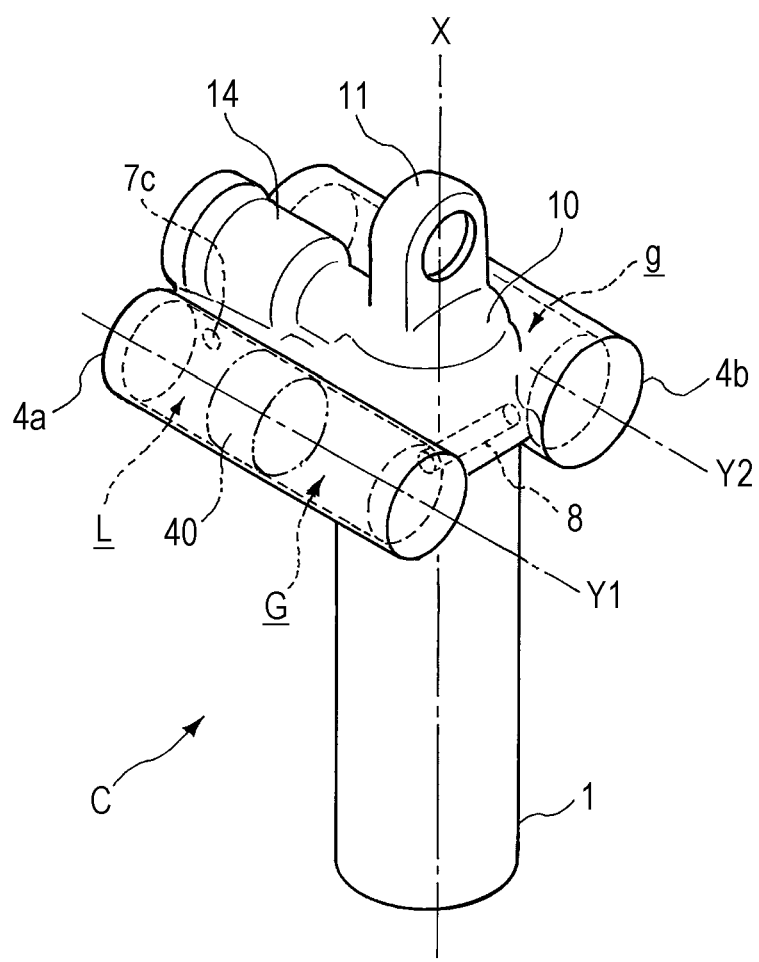
FIG. 4 is a perspective view illustrating a cylinder-tank combined member of a shock absorber according to an embodiment of the present invention.
Figure 5:
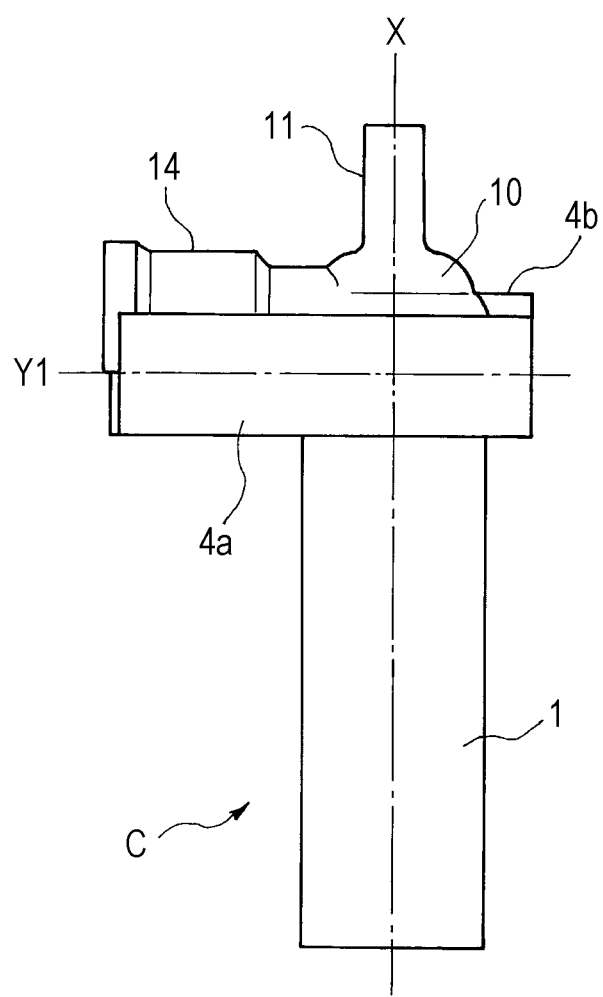
FIG. 5 is a right side view illustrating a cylinder-tank combined member of a shock absorber according to an embodiment of the present invention.
Figure 6:
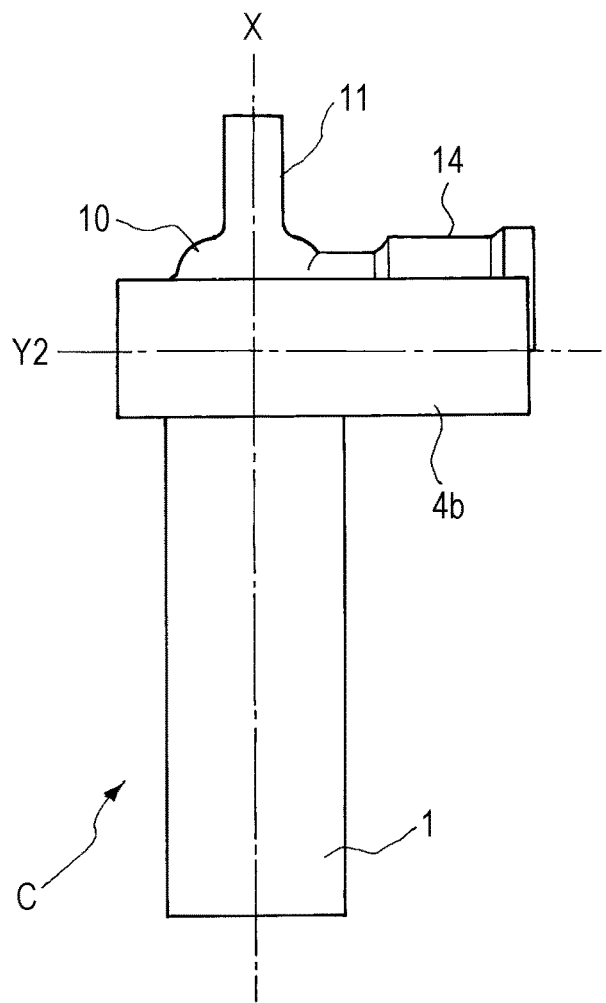
FIG. 6 is a left side view illustrating a cylinder-tank combined member of a shock absorber according to an embodiment of the present invention.

Thus, when the cylinder 1, the main tank 4*a*, and the gas tank 4*b* share the partition walls, a central axis Y1 of the main tank 4*a* and a central axis Y2 of the gas tank 4*b* are close to a central axis (a straight line passing through the center of the cylinder 1 in the axial direction) X of the cylinder 1 (FIG. 4). Thus, the main tank 4*a*, the gas tank 4*b* have small projection amounts with respect to the cylinder 1.

In addition, when the cylinder 1, the main tank 4*a*, and the gas tank 4*b* are integrally formed, as compared with the case in which a plurality of separately formed components are integrated by screwing, welding, press-fitting, or the like, a thickness for sufficient joint strength is not required. Also, from the above, when the cylinder 1, the main tank 4*a*, and the gas tank 4*b* are integrally formed, the main tank 4*a* and the gas tank 4*b* have small projection amounts with respect to the cylinder 1.

In the present embodiment, with the shock absorber A being attached to the saddle-type vehicle V, the main tank 4*a* and the gas tank 4*b* are arranged to sandwich an upper end of the cylinder 1 in a front-and-rear direction of the vehicle body B and to follow the vehicle width direction of the vehicle body B perpendicular to the cylinder 1 (FIG. 1). In other words, the main tank 4*a* and the gas tank 4*b* are arranged on the front and rear sides of the upper end of the cylinder 1 such that the central axes Y1 and Y2 are parallel and follow the direction perpendicular to the central axis X of the cylinder 1.

Thus, when the main tank 4*a* and the gas tank 4*b* are reduced in size and diameter (lateral dimension) and are integrally formed with the cylinder 1, particularly a projection amount m1 (FIGS. 2 and 7) of the main tank 4*a* toward the front side of the vehicle body with respect to the cylinder 1 and a projection amount m2 (FIGS. 2 and 7) of the gas tank 4*b* toward the rear side of the vehicle body with respect to the cylinder 1 are reduced. Therefore, even when the spaces on the front and rear sides of the cylinder 1 in the saddle-type vehicle V are small, the shock absorber A can be attached.

When the lateral projection amounts m1 and m2 of the main tank 4a and the gas tank 4b projecting from the cylinder 1 in the opposite direction are reduced as described above, the horizontal width (in FIG. 7, the length of the cylinder-tank combined member C in a right-and-left direction) of the shock absorber A along the diametric direction (lateral direction) of the main tank 4a and the gas tank 4b is also reduced. Therefore, even when the width in the front-and-rear direction of the attachment space of the shock absorber A in the saddle-type vehicle V is small, the shock absorber A can be attached.

With the aforementioned arrangement, both the main tank 4a and the gas tank 4b are arranged near the upper end of the cylinder 1. Therefore, the movable range of the upper spring receiver 12 (FIG. 2) toward the upper side is increased such that the range of adjustment of the initial load of the suspension spring 3 can be increased.

Next, as illustrated in FIG. 4, one axial ends of the main tank 4a and the gas tank 4b protruding from the cylinder 1 in the same direction are connected by the gas passage 8, and a connection port 7c for the suction passage 7a and the discharge passage 7b is provided at the other end of the main tank 4a on the opposite side from the gas passage 8.

The cylinder-tank combined member C includes a housing 14 between the main tank 4a and the gas tank 4b. The housing 14 accommodates the check valve 70 of the suction passage 7a and the damping element 71 of the discharge passage 7b. As illustrated in FIG. 2, the operation portion of the adjuster 5 for operating the damping element 71 and the operation portion of the gas valve 9 for feeding and discharging the gas to and from the sub-air chamber g face in the same direction.

Specifically, the operation portion of the adjuster 5 is, for example, a knob, an engagement portion of a tool, or the like in the case of rotation operation of the adjuster 5. The operation portion of the gas valve 9 is a connection including a gas feed and discharge port. A gas feed hose or the like can be connected to the connection.

The shock absorber A of the present embodiment includes the cylinder 1 including the working chamber R therein, the rod 2 axially movably inserted into the cylinder 1, and the tanks 4 and 4 integrally attached to the cylinder 1. The one tank 4 is the main tank 4a, and the interior of the main tank 4a is comparted into the liquid chamber L communicated with the working chamber R and filled with the liquid and the air chamber G filled with the gas. The other tank 4 is the gas tank 4b, and the interior of the gas tank 4b includes the sub-air chamber g communicated with the air chamber G.

Thus, in the present embodiment, the two tanks: the main tank 4a and the gas tank 4b between which the gas can be transferred are integrally attached to the cylinder 1, and the total volume of the main tank 4a and the gas tank 4b is the overall tank volume. With the above configuration, as compared with the single tank of the conventional shock absorber, the main tank 4a and the gas tank 4b can be smaller in size. Thus, the projection amounts of the main tank 4a and the gas tank 4b with respect to the cylinder 1 can be reduced, enabling increase in mountability of the shock absorber A.

Specifically, for example, as illustrated in FIG. 1, in cases where the shock absorber A is used for a rear cushion apparatus for suspending the rear wheel W of the saddle-type vehicle V, even when the tank 4 is present on the front and rear sides of the cylinder 1 when the shock absorber A is attached to the saddle-type vehicle V, the front and rear projection amounts m1 and m2 can be suppressed. Thus, the shock absorber A can be applied even to a vehicle with a small space on the front and rear sides of the cylinder 1.

Furthermore, with the above configuration, only the one tank 4(4a) accommodates the liquid and the gas, and the other tank 4(4b) accommodates the gas only. Thus, because the number of main tanks 4a for accommodating the liquid and the gas is one, one separation member, e.g., the free piston 40, for separating the liquid chamber from the air chamber G suffices. Thus, even a plurality of tanks 4 does not complicate the structure of the shock absorber A, enabling easy control of the motion of the separation member.

Specifically, for example, when the tanks accommodate the liquid and the gas, and are separated by the separation member, the separation members in the tanks move when the shock absorber is expanded and contracted. Then, due to variations or the like in slide resistance of the separation members, there is a possibility that the separation member that easily moves excessively move and reach the end of the stroke, or one of the separation members does riot move. Thus, it is difficult to predict the motion of the separation members, and it is difficult to move the separation members as intended. In contrast, when the number of separation members is one, the motion is easy to predict, and the separation member is easy to move as intended.

In the present embodiment, with the shock absorber A being attached to the saddle-type vehicle V, the two tanks 4 and 4 integrally attached to the cylinder 1 are arranged on the front and rear sides of the cylinder 1 of the vehicle body B. The tank 4 on the front side on the vehicle body is the main tank 4a, and the tank 4 on the rear side on the vehicle body is the gas tank 4b. However, any one of the two tanks 4 and 4 may be the main tank 4a.

It is sufficient that the number of tanks 4 integrally attached to the cylinder 1 is several and is not limited to two. For example, three or more tanks 4, 4, 4 . . . may integrally be attached to the cylinder 1. When three or more tanks 4 are provided, one tank 4, which is one of them, is the main tank 4a and all the other tanks 4, 4 . . . are the gas tanks 4b. When a plurality of gas tanks 4b are provided, the sub-air chambers g of all the gas tanks 4b may be separately connected to the air chamber G with the gas passages. The sub-air chamber g of one gas tank 4b may be communicated with the air chamber G via the sub-air chamber g of another gas tank 4b.

In the present embodiment, the cylinder 1 and all the tanks 4 are integrally formed, forming a single cylinder-tank combined member C. In other words, the cylinder 1, the main tank 4a, and the gas tank 4b are parts of the cylinder-tank combined member C, which is a single component. With the above configuration, the cylinder 1 and the main tank 4a, and the cylinder 1 and the gas tank 4b partially share the partition walls.

With the above configuration, the central axis Y1 of the main tank 4a and the central axis Y2 of the gas tank 4b can be close to the central axis X of the cylinder 1. Therefore, the projection amounts of the main tank 4a and the gas tank 4b can be further reduced. In addition, as compared with the case in which the cylinder 1 and the tanks 4, 4 . . . , which are separately formed, are integrated by screwing, welding, press-fitting, or the like, a thickness for sufficient joint strength is not required. Also, from the above, the projection amounts of the main tank 4a and the gas tank 4b can be further reduced.

However, as used herein integration covers the case in which the cylinder 1 and the tanks 4, which are separately formed, are fixed to one another by screwing, welding, press-fitting, or the like such that the mutual position and angle does not easily change and handling as a lump of components becomes possible, in addition to the case in which the cylinder 1 and the tanks 4, 4 . . . are integrally formed to form the single cylinder-tank combined member C. Thus, for example, the cylinder 1 may be integrated by screwing with the integrally formed member of the main tank 4a and the gas tank 4b. Such a change can be made regardless of the number of gas tanks 4b.

In the present embodiment, both the main tank 4a and the gas tank 4b have a cylindrical shape and face in the same direction. That is, because the main tank 4a and the gas tank 4b having a cylindrical shape are arranged in a parallel direction, the part including the cylinder 1, the main tank 4a, and the gas tank 4b of the shock absorber A has a simple shape, enabling easy formation of the shock absorber A. Furthermore, since the main tank 4a has a cylindrical shape, the free piston 40 is easy to slidably insert therein. That is, with the above configuration, it is easy to adopt the free piston 40 as the separation member for separating the liquid chamber L from the air chamber G, and it is possible to increase the degree of freedom of selection regarding the configuration of the separation member.

In the present embodiment, there are two tanks 4: the main tank 4a and the gas tank 4b. These two tanks 4 and 4 are arranged to sandwich the cylinder 1 on both sides. Therefore, the direction in which the one tank 4 projects from the cylinder 1 can be opposite from the direction in which the other tank 4 projects from the cylinder 1. Thus, for example, the two tanks 4 and 4 can be arranged with effective use of the spaces on both sides of the cylinder 1 in the radial direction, e.g., the front and rear sides of the cylinder 1 of the saddle-type vehicle V.

In the present embodiment, the two tanks 4 and 4 having a cylindrical shape arranged to sandwich the cylinder 1 on both sides are arranged such that the diameter of each tank 4 follows the direction perpendicular to the central axis X of the cylinder 1. Therefore, the projection amounts m1 and m2 of the two tanks 4 and 4 projecting from the cylinder 1 in the opposite direction can be reduced, and the width of the shock absorber A along the diametric direction of each tank 4 can be reduced.

In the present embodiment, the two tanks 4 and 4 having a cylindrical shape arranged to sandwich the upper end (one axial end) of the cylinder 1 on both sides are arranged in a direction perpendicular to the cylinder 1. Therefore, when the suspension spring 3 is supported by the upper spring receiver (spring receiver) 12 placed on the outer circumference of the cylinder 1, the upper spring receiver 12 can be arranged close to the upper end of the cylinder 1 and the two tanks 4 and 4 do not interfere with the placement of the upper spring receiver 12. With the above configuration, when the upper spring receiver 12 is driven to adjust the initial load of the suspension spring 3, the movable range of the upper spring receiver 12 toward the upper side can be increased. Therefore, the range of adjustment of the initial load of the suspension spring 3 can be increased.

When the two tanks 4 and 4 are integrally attached to the one axial end of the cylinder 1 as described above, it is favorable for lesser projection amount of each tank 4 that the cylinder 1, the two tanks 4 and 4, and the lid 10 for closing the upper end of the cylinder 1 be integrally formed when an attachment portion for coupling the cylinder 1 to the vehicle body or the axle, e.g., the vehicle body-side attachment portion 11, is attached to the lid 10, the cylinder 1, the two tanks 4 and 4, the lid 10, and the attachment portion are favorably integrally formed as in the case of the cylinder-tank combined member C of the present embodiment.

For suppression of the projection amount of each tank 4 from the cylinder 1, it is preferable that the plurality of tanks 4 and 4 . . . be provided at positions displaced in the circumferential direction or in the axial direction of the cylinder 1 such that the tanks 4 do not overlap and one tank 4 is not positioned between the cylinder 1 and another tank 4. In this manner, the arrangement of the tanks 4 with respect to the cylinder 1 can be changed properly.

For example, the gas tank 4b may be provided at an angle relative to the main tank 4a. One of the main tank 4a and the gas tank 4b, or both, may be provided to face in the same direction as the cylinder 1. The main tank 4a and the gas tank 4b may be arranged closely or in contact with each other. It is sufficient to select members to be integrally formed depending on such an arrangement, and the above changes may be made regardless of the number of gas tanks 4b.

In particular, the shape of the gas tank 4b is not limited to a cylindrical shape, but can be changed freely. For example, the gas tank 4b may have a C-shape and be attached along the circumferential direction of the cylinder 1 so as to be wound around the outer circumference of the cylinder 1. In cases where the liquid chamber L is separated from the air chamber G in the main tank 4a by a bladder or the like and a slidable member, e.g., the free piston 40, is not accommodated in the main tank 4a, the main tank 4a may have a shape different from a cylindrical shape. Such a change may be made regardless of the number of gas tanks 4b, the arrangement of each tank 4 with respect to the cylinder 1, and members to be integrally formed with the cylinder 1.

The shock absorber A of the present embodiment includes the damping element 71 that exerts resistance to the flow of the liquid transferred between the working chamber R of the cylinder 1 and the liquid chamber L of the main tank 4a, the adjuster 5 for operating the damping element 71, and the gas valve 9 for feeding and discharging the gas to and from the air chamber G. The adjuster 5 and the gas valve 9 are arranged such that the operation portions thereof face in the same direction. It is possible to have favorable workability in performing both the adjustment of the damping force and the adjustment of the pressures of the air chamber G and the sub-air chamber g.

In order for the main tank 4a having a cylindrical shape and the gas tank 4b having a cylindrical shape to be arranged side by side an the same orientation and for the operation portion of the adjuster 5 and the operation portion of the gas valve 9 to face in the same direction, it is favorable that one end of the main tank 4a on the air chamber G side and one end of the gas tank 4b protruding in the same direction as the one end of the main tank 4a be connected by the gas passage 8, the suction passage 7a and the discharge passage 7b be connected to the other end of the main tank 4a on the side opposite from the gas passage 8 (liquid chamber L side), and the gas valve 9 be attached to the other end of the gas tank 4b.

This is because, in this way, the gas passage 8, the suction passage 7a, the discharge passage 7b, and a gas feed and discharge passage (not illustrated) through which the gas feed and discharge port of the gas valve 9 communicates with the sub-air chamber g can be shortened, and the configuration for operating the damping element 71 on the discharge passage 7b with the adjuster 5 can be simplified.

However, the arrangement of the adjuster 5 and the gas valve 9, and the arrangement of the suction passage 7a, the discharge passage 7b, and the gas passage 8 can be changed properly. For example, the gas valve 9 may be attached to the main tank 4a or to the connection between the main tank 4a and the gas tank 4b. When the working chamber R is partially extended into the main tank 4a and the damping element 71 is provided in the main tank 4a, the adjuster 5 may be attached to the main tank 4a. Such a change may be made regardless of the number of gas tanks 4b, the arrangement and shape of each tank 4 with respect to the cylinder 1, and members to be integrally formed with the cylinder 1.

What is claimed is:

1. A shock absorber comprising:
   a cylinder including a working chamber therein;
   a rod configured to be axially movably inserted into the cylinder; and
   a plurality of tanks configured to be integrally attached to the cylinder,
   wherein
   an interior of one of the tanks is comparted into a liquid chamber configured to be communicated with the working chamber and filled with liquid and an air chamber filled with gas, and
   a sub-air chamber configured to be communicated with the air chamber is formed in another one of the tanks.

2. The shock absorber according to claim 1, wherein the tanks have a cylindrical shape and face in a same direction.

3. The shock absorber according to claim 1, wherein a number of the tanks is two, and the two tanks are arranged to sandwich the cylinder on both sides.

4. The shock absorber according to claim 1, comprising:
   a damping element configured to exert resistance to a flow of liquid transferred between the working chamber and the liquid chamber;
   an adjuster configured to operate the damping element; and
   a gas valve configured to feed and discharge to and from the air chamber,
   wherein
   the adjuster and the gas valve are arranged such that operation portions of the adjuster and the gas valve face in a same direction.

5. The shock absorber according to claim 1, wherein the cylinder and all the tanks are integrally formed and form a single cylinder-tank combined member.

* * * * *